No. 808,219.  
H. A. SCHROEDER.  
HOSE COUPLING.  
APPLICATION FILED MAR. 20, 1905.  
PATENTED DEC. 26, 1905.
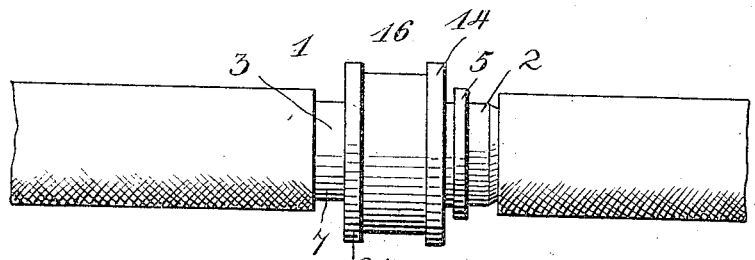
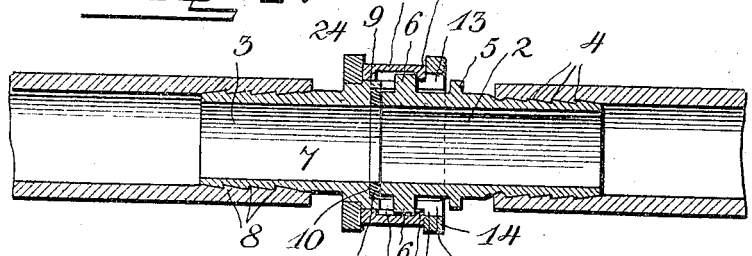
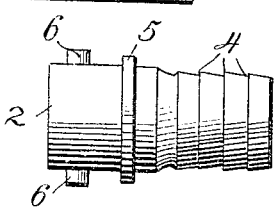
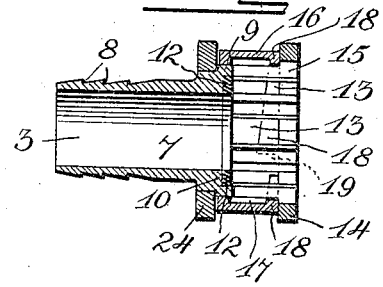
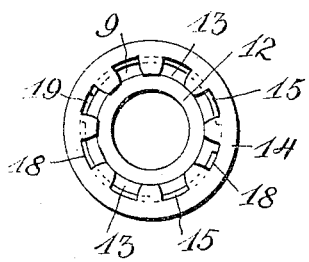
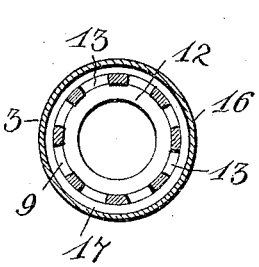
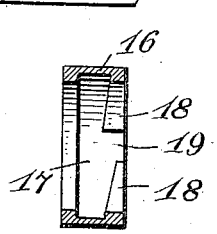
Witnesses  
C. Muntra  
C. H. Griesbauer
Inventor  
Henry A. Schroeder  
by H. B. Wilson  
Attorney

UNITED STATES PATENT OFFICE.

HENRY A. SCHROEDER, OF BALTIMORE, MARYLAND.

HOSE-COUPLING.

No. 808,219.　　　　Specification of Letters Patent.　　　　Patented Dec. 26, 1905.

Application filed March 20, 1905. Serial No. 251,091.

*To all whom it may concern:*

Be it known that I, HENRY A. SCHROEDER, a citizen of the United States, residing at Baltimore, in the State of Maryland, have invented certain new and useful Improvements in Hose-Couplings; and I do declare the following to be a full, clear, and exact description of the invention, such as will enable others skilled in the art to which it appertains to make and use the same.

This invention relates to improvements in hose-couplings.

The object of the invention is to provide a hose-coupling by which sections of hose may be quickly and easily coupled together to form a water-tight joint between the same.

A further object is to provide a coupling of this character the parts of which are so constructed and arranged that when the members of the coupling are engaged they will not be easily uncoupled by the dragging of the hose over the ground or in any other casual manner.

With these and other objects in view the invention consists of certain novel features of construction, combination, and arrangement of parts, as will be hereinafter described and claimed.

In the accompanying drawings, Figure 1 is a side elevation of the meeting ends of two hose-sections, showing the same connected by the improved coupling. Fig. 2 is a longitudinal sectional view of the same. Fig. 3 is a side elevation of the male member of the coupling removed from the female member. Fig. 4 is a longitudinal sectional view through the female member of the coupling. Fig. 5 is an end elevation of the same. Fig. 6 is a transverse sectional view through the female member, taken through the clamping ring or band thereof; and Fig. 7 is a longitudinal sectional view through the clamping-band removed from the female member of the coupling.

Referring more particularly to the drawings, 1 denotes the coupling, which comprises a male member 2 and a female member 3.

The male member of the coupling consists of a cylindrical tubular section having formed on one end a series of annular corrugations or offsets 4, by which the same is securely engaged with the end of a section of hose. On the tubing of the male member, adjacent to the inner end of the corrugated portion thereof, is formed an annular flange 5 to receive the end of the hose-section. On the outer end of the male member beyond the flange 5 are formed radially-projecting cylindrical lugs 6, said lugs being formed at diametrically opposite points and near the outer end of the male member.

The female member of the coupling consists of a cylindrical portion 7, on the inner end of which is formed a series of annular corrugations or offsets 8, by which the same is securely engaged with the end of the section of hose. On the outer end of the tube 7 is formed a cylindriacl socket 9, the diameter of which is slightly greater than that of the tube 7, thereby forming a shoulder 10 on the outer end of the tube. Said shoulder and the adjacent annular wall of the socket form a seat to receive a washer 12. The annular wall of the socket is provided with a series of radially-disposed slots 13, which extend through the outer end of the socket, and on said outer end of the socket is formed an outwardly-projecting annular flange 14. The inner edge or wall of this flange 14 is provided with a series of radially-disposed notches 15, disposed in alinement with or coincident with the slots 13 in the wall of the socket. On the cylindrical wall of the socket is arranged a clamping ring or band 16, which has formed on its inner wall an annular groove or channel 17. The outer wall of said channel 17 is formed by two oppositely-disposed segmental cam-shaped flanges 18, the ends of which are spaced apart to form oppositely-disposed longitudinal passages 19. The ring or band 16 is mounted to freely turn upon the slotted cylindrical wall of the socket to bring the passages 19 opposite or in alinement with any of the slots 13 formed in the wall of the socket. The ring or band 16 is revolubly held in place upon the wall of the socket by means of the annular flange 14 and an annular collar 24, which is shrunk or otherwise secured upon the tube 7 adjacent to the inner end of the socket 9. The flange 14 and the collar 24 are of greater thickness than the clamping-band 16, thereby forming annular projections at each end of the same which will prevent the band from coming into engagement with the ground when the hose is dragged over the same, thus preventing the band from being casually turned upon the cylindrical wall of the socket.

In coupling two pieces of hose together the clamping band or ring is first turned to bring the passage 19 between the cam-flanges 18 opposite or into alinement with the slots formed in the wall of the socket, after which the male member of the coupling is inserted into the open end of the socket 9, the lugs 6 on said male member entering the notches 15 in the flange 14 and the slots 13, with which said notches are alined, after which the clamping-band is turned to bring the cam-faces of the flanges 18 into engagement with said lugs, thereby drawing the inner end of the male member of the coupling into tight engagement with the washer 12 at the inner end of the socket 9, thus forming a water-tight connection between the coupling members and preventing the separation of the parts by a twisting or torsional strain of the hose.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

The herein-described hose-coupling comprising a male member having annular corrugations to secure the same to a hose, laterally-projecting lugs formed on said male member, a female member having corrugations to secure the same to a hose, a socket formed on the outer end of said female member to receive the outer end of said male member, the annular wall of said socket having formed therein an annular series of radially-disposed slots to receive the lugs on said male member, a clamping ring or band revolubly mounted on said socket and having formed in its inner side an annular groove or channel, segmental, cam-shaped flanges formed on the inner walls of said clamping-bands to engage the lugs on the male member, whereby when said band is turned said male member will be clamped into tight engagement with said female member, an annular flange formed on the outer end of said socket, and a collar arranged on the inner end of the same between which said clamping-band turns said flange and collar projecting beyond the outer wall of said band thereby preventing the same from engaging the ground and being casually turned to release the male member, essentially as described.

In testimony whereof I have hereunto set my hand in presence of two subscribing witnesses.

HENRY A. SCHROEDER.

Witnesses:
HENRY ROSCHEN,
HENRY REA.